US009223835B1

(12) United States Patent
Mazniker et al.

(10) Patent No.: US 9,223,835 B1
(45) Date of Patent: *Dec. 29, 2015

(54) RANKING AND ORDERING ITEMS IN STREAM

(71) Applicant: Google Inc., Mountain View, CA (US)

(72) Inventors: Boris Mazniker, San Francisco, CA (US); Andrew A. Bunner, Belmont, CA (US); Jonathan Terleski, Mountain View, CA (US); Shimrit Ben-Yair, Sunnyvale, CA (US); Gregory M. Marra, San Francisco, CA (US); Ryo Misha Urano, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,476

(22) Filed: Jul. 28, 2014

Related U.S. Application Data

(63) Continuation of application No. 13/357,167, filed on Jan. 24, 2012, now Pat. No. 8,843,491.

(51) Int. Cl.
*G06F 17/30* (2006.01)

(52) U.S. Cl.
CPC ...... *G06F 17/30551* (2013.01); *G06F 17/3053* (2013.01); *G06F 17/30598* (2013.01); *G06F 17/30705* (2013.01)

(58) Field of Classification Search
CPC ............... G06F 17/30598; G06F 17/30705
USPC ........................................................ 707/737
See application file for complete search history.

(56) References Cited

U.S. PATENT DOCUMENTS

| | | | |
|---|---|---|---|
| 5,813,863 | A | 9/1998 | Sloane et al. |
| 5,978,928 | A | 11/1999 | Rust |
| 6,643,187 | B2 | 11/2003 | Mokhlesi |
| 7,539,632 | B1 | 5/2009 | Chakrabarti et al. |
| 7,822,631 | B1 | 10/2010 | Vander Mey et al. |

(Continued)

FOREIGN PATENT DOCUMENTS

| | | |
|---|---|---|
| EP | 2568427 | 3/2013 |
| WO | WO2011064742 A1 | 6/2011 |

OTHER PUBLICATIONS

Jon Duck-Schlossberg et al., "Battlefield Awareness and Data Dissemination Intelligent Information Dissemination Server," Final Technical Report, Air Forces Search Laboratory, Lockheed-Martin Corporation, Nov. 1999, 31 pages.

(Continued)

*Primary Examiner* — Joshua Bullock

(74) *Attorney, Agent, or Firm* — Fish & Richardson P.C.

(57) ABSTRACT

Methods, systems, and apparatus, including computer programs encoded on a computer storage medium, for identifying a plurality of items to be displayed to a user, each item including digital content and being associated with a respective timestamp, receiving a plurality of scores, each score being associated with an item of the plurality of items, determining a subset of items to be displayed to the user based on the plurality of scores, the subset of items including items of the plurality of items, grouping items in the subset of items based on respective timestamps to provide a plurality of item groups, for each item group, determining an order of items based on respective scores, and transmitting instructions to display items to the user based on the plurality of item groups and in the order within each item group.

20 Claims, 9 Drawing Sheets

(56) References Cited

U.S. PATENT DOCUMENTS

| | | |
|---|---|---|
| 8,606,792 B1 | 12/2013 | Jackson et al. |
| 9,043,313 B2 | 5/2015 | Kumar |
| 2006/0294085 A1 | 12/2006 | Rose et al. |
| 2008/0040475 A1 | 2/2008 | Bosworth et al. |
| 2008/0059576 A1 | 3/2008 | Liu et al. |
| 2009/0007167 A1 | 1/2009 | Artom |
| 2009/0132520 A1 | 5/2009 | Nemeth et al. |
| 2009/0177588 A1 | 7/2009 | Marchese |
| 2009/0234945 A1 | 9/2009 | Chande et al. |
| 2009/0271391 A1 | 10/2009 | Kawale et al. |
| 2010/0036784 A1 | 2/2010 | Mishne et al. |
| 2010/0076850 A1 | 3/2010 | Parekh et al. |
| 2010/0100618 A1 | 4/2010 | Kuhlke et al. |
| 2010/0121849 A1 | 5/2010 | Goeldi |
| 2010/0228732 A1 | 9/2010 | Rhee et al. |
| 2010/0241580 A1 | 9/2010 | Schleier-Smith |
| 2010/0262658 A1 | 10/2010 | Mesnage |
| 2011/0022602 A1 | 1/2011 | Luo et al. |
| 2011/0040760 A1* | 2/2011 | Fleischman et al. ......... 707/737 |
| 2011/0041080 A1* | 2/2011 | Fleischman et al. ......... 715/751 |
| 2011/0154223 A1 | 6/2011 | Whitnah et al. |
| 2011/0191372 A1 | 8/2011 | Kaushansky et al. |
| 2011/0225170 A1 | 9/2011 | Obasanjo et al. |
| 2011/0231296 A1 | 9/2011 | Gross et al. |
| 2011/0246907 A1 | 10/2011 | Wang et al. |
| 2011/0302123 A1 | 12/2011 | Nista et al. |
| 2011/0302152 A1 | 12/2011 | Boyd et al. |
| 2011/0314098 A1 | 12/2011 | Farrell et al. |
| 2012/0005203 A1* | 1/2012 | Brzozowski et al. ......... 707/732 |
| 2012/0042386 A1 | 2/2012 | Backer |
| 2012/0158516 A1 | 6/2012 | Wooten et al. |
| 2012/0158753 A1 | 6/2012 | He et al. |
| 2012/0215903 A1 | 8/2012 | Fleischman et al. |
| 2012/0226701 A1 | 9/2012 | Singh |
| 2012/0284282 A9 | 11/2012 | Ghosh et al. |
| 2012/0330932 A1 | 12/2012 | Boyd et al. |
| 2013/0006882 A1 | 1/2013 | Galliani |
| 2013/0014031 A1 | 1/2013 | Whitnah et al. |
| 2013/0018896 A1* | 1/2013 | Fleischman et al. ......... 707/748 |
| 2013/0024757 A1 | 1/2013 | Doll et al. |
| 2013/0073983 A1 | 3/2013 | Rasmussen et al. |
| 2013/0204833 A1 | 8/2013 | Pang et al. |
| 2013/0218976 A1 | 8/2013 | Bosworth et al. |
| 2013/0246521 A1 | 9/2013 | Schacht et al. |
| 2013/0346497 A1 | 12/2013 | Hofmayer et al. |
| 2014/0013241 A1 | 1/2014 | Brown et al. |
| 2014/0298160 A1 | 10/2014 | Norwood et al. |

OTHER PUBLICATIONS

Lada A. Adamic et al., "Social network caught in the Web," First Monday, vol. 8, No. 6, Jun. 2, 2003, 22 pages.

Alice Emily Marwick, "Selling Your Self: Online Identity in the Age of a Commodified Internet," Thesis for degree of Master of Arts, University of Washington, 2005, 192 pages.

Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.

Ronald van Eijk et al., "We-centric, context-aware, adaptive mobile service bundles," Telematica Instituut, Freeband Frux D1.1, Nov. 30, 2004, 48 pages.

Marc Steen et al., "Development of we-centric, context-aware, adaptive mobile services requires empathy and dialogue," Freeband Frux, 2005, 4 pages.

Tony Hammond et al., "Social Bookmarking Tools (I)," D-Lib Magazine, vol. 11, No. 4, Apr. 2005, 23 pages.

"How do I control what I see in my news feed?". Facebook [online]. [Retrieved on Aug. 15, 2012]. Retrieved from the Internet: <URL: www.facebook.com>, 1 pg.

"How do I block or unblock someone?". Facebook [online] [Retrieved on Aug. 15, 2012]. Retrieved from the Internet: <URL: http://m.facebook.com/help/126089290825165?refr=m-search>, 1 pg.

"Getting started with circles", Google+[online]. [Retrieved on Aug. 15, 2012]. Retrieved from the Internet: <URL: http://support.google.com/plus/bin/answer.py?hl=en&answer=1254208>, 1 pg.

* cited by examiner

RANKING AND ORDERING ITEMS IN STREAM

CROSS-REFERENCE TO RELATED APPLICATIONS

This application is a continuation of U.S. patent application Ser. No. 13/357,167, entitled "Ranking And Ordering Items In Stream," filed Jan. 24, 2012, which is incorporated herein by reference in its entirety.

BACKGROUND

This specification generally relates to displaying content distributed to users in a social networking service.

Internet-based social networking services provide a digital medium for users to interact with one another and share information. For examples, users are able to distribute digital content (e.g., textual comments, digital images, digital videos, digital audio, hyperlinks to websites, etc.) to other users that they might be connected with in the social networking service. Digital content that is distributed to a user can be displayed to the user in a stream page.

As a user's social network within the social networking service increases, the amount of digital content distributed to the user and the amount of digital content that the user interacts with can significantly increase. Consequently, the user's stream page may overwhelm the user with digital content, which can include digital content that may not be relevant to the user and/or digital content that may be of low quality (e.g., spam).

SUMMARY

In general, innovative aspects of the subject matter described in this disclosure may be embodied in methods that include the actions of identifying a plurality of items to be displayed to a user, each item including digital content and being associated with a respective timestamp, receiving a plurality of scores, each score being associated with an item of the plurality of items, determining a subset of items to be displayed to the user based on the plurality of scores, the subset of items including items of the plurality of items, grouping items in the subset of items based on respective timestamps to provide a plurality of item groups, for each item group, determining an order of items based on respective scores, and transmitting instructions to display items to the user based on the plurality of item groups and in the order within each item group. Other implementations of this aspect include corresponding systems, apparatus, and computer programs, configured to perform the actions of the methods, encoded on computer storage devices.

These and other implementations may each optionally include one or more of the following features. For instance, determining the subset of items is achieved by: comparing each score of the plurality of scores to a threshold score, and including an item in the subset of items when a respective score of the item is exceeds the threshold score; the order includes a descending order based on score; actions further include receiving a plurality of timestamps, each timestamp including the respective timestamp that is associated with an item of the plurality of items; grouping items is achieved by: comparing each timestamp of the plurality of timestamps to a timestamp range associated with the subset of items, and including an item in the subset of items when a respective timestamp of the item is within an item group that is associated with the timestamp range; each timestamp is determined based on an event associated with the respective item; each timestamp corresponds to a time at which a respective item is generated; each score of the plurality of scores is specific to the user; the digital content includes digital content distributed using a computer-implemented social networking service; items are displayed to the user in a stream page of a social networking service; each score is based on at least one of a quality score, a social score and a relevance score; the quality score indicates a quality of an associated item; the social score is a user-specific, item-specific score and is determined based on a social affinity between the user and an author user of an associated item; the relevance score is a user-specific, item-specific score and indicates a relevance of an associated item to the user; and actions further include: receiving a plurality of updated scores, each updated score corresponding to a score of the plurality of scores, determining an updated subset of items to be displayed to the user based on the plurality of scores, the updated subset of items comprising items of the plurality of items, grouping items in the subset of items based on respective, updated timestamps to provide a plurality of updated item groups, for each updated item group, determining an order of items based on respective updated scores, and transmitting instructions to display items in the updated subset in place of the subset of items based on the plurality of updated item groups and in the order within each updated item group.

Implementations of the present disclosure provide one or more of the following example advantages. Implementations increase the relevance of the social networking service to the users by more prominently displaying items that might be more relevant to respective users. Implementations promote conversational use of the social networking service and help ensure that users do not miss important content. Implementations also enable users to use their time more efficiently by filtering out low quality content.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
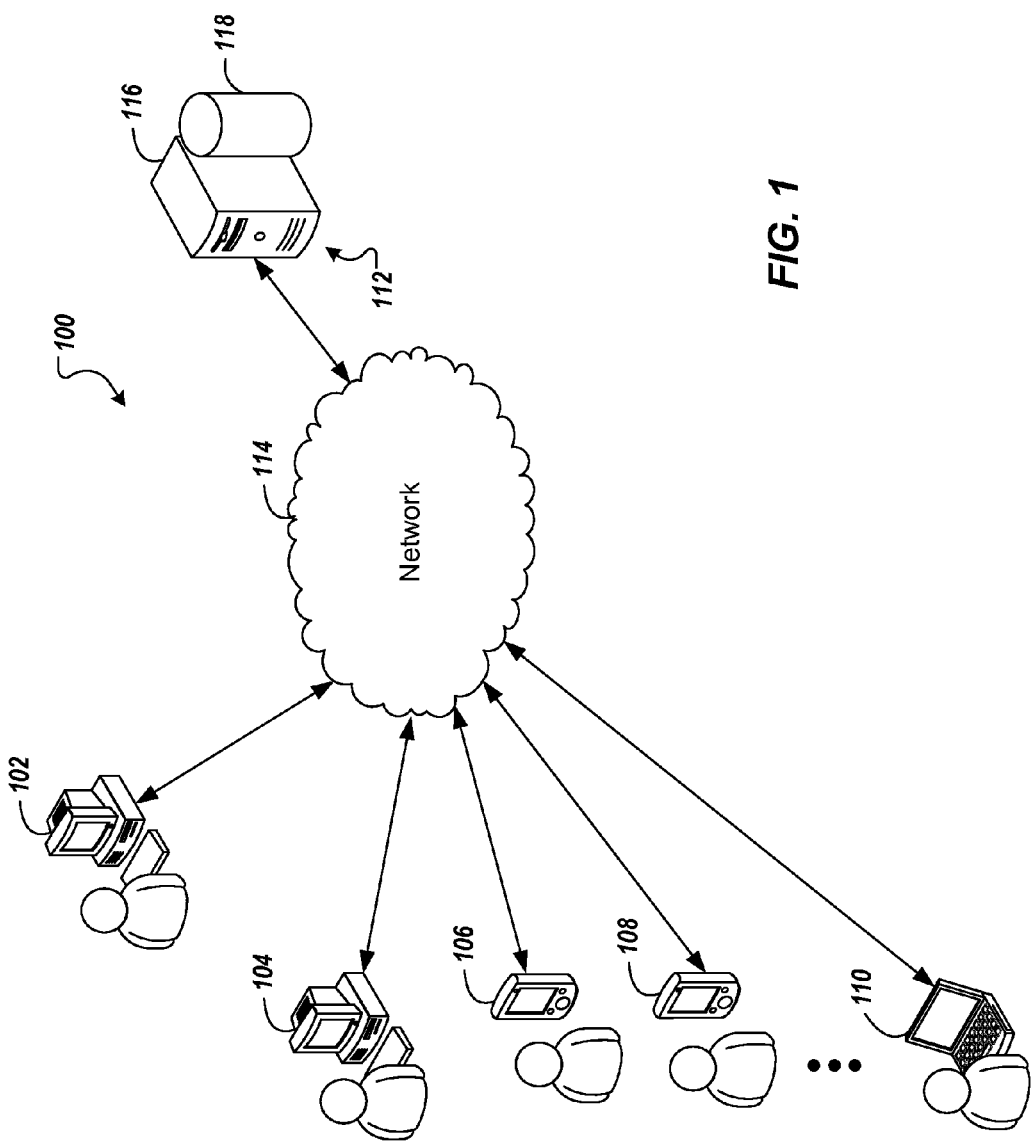
FIG. 1 is a diagram of an example network architecture.

In general, implementations of the present disclosure are directed to displaying items in stream pages of users of a social networking service. In particular, implementations of the present disclosure are directed to ranking and ordering items displayed to a user within a stream page of the user. The stream page displays digital content that has been posted by the user to the social networking service and/or digital content distributed to the user through the social networking service. In some examples, each item that is to be displayed in the stream page of a user is associated with an item score and a timestamp. Items are displayed within the stream page of the user based on the item scores and timestamps. In some examples, items are grouped based on timestamp. In some examples, items within groups are ranked based on item score. Items are displayed in the stream page of the user based on group and in order within a group based on rank. In this manner, the most relevant, highest quality items are displayed more prominently to the user.

In some examples, the timestamp for an item is determined based on one or more events associated with the item. Example events can include original distribution of the item (e.g., when the item was posted to the social networking service), a comment appended to the item (e.g., when a user (either the author of the item or non-author of the item) posts a comment to the item), an endorsement of the item (e.g., when a user (either the author of the item or non-author of the item) indicates that they endorse the item), sharing of the item (e.g., when a non-author user re-posts, or otherwise redistributes the item within the social networking service).

In some examples, a timestamp for the item can be determined based on weighting applied to events as they occur. For example, an item weight can be set to an initial value (e.g., 0) when the item is first distributed (e.g., when the author generates and distributes the item). The item weight can be incremented based on each event. The degree to which the item weight is incremented can vary based on event type and/or characteristics of the event. For example, a comment to the item can increment the item weight by a first value and an endorsement of the item can increment the item weight by a second value. In some examples, the first value can be exceeds the second value, indicating that a comment is considered to be more substantial than an endorsement. In some examples, the first value can be based on a social affinity (discussed further below) between the author of the item and the user posting the comment to the item. For example, the first value is higher for a user that has a high social affinity to the author than for a user that has little, if any, social affinity to the author. The item weight can be compared to a threshold item weight. When the item weight is exceeds the threshold item weight, the timestamp of the item is set to the timestamp of the most recent event.

In some implementations, the threshold item weight for a particular item can vary over time. In some examples, the threshold item weight can gradually increase over time. In this manner, a timestamp associated with the particular item is not updated over and over again to inhibit recurring bumping of the particular item higher within stream pages in long conversations (e.g., numerous comments posted to the item). In some examples, the threshold item weight can be increased on a per-user basis. For example, for a user that has generated an event associated with the item, the threshold item weight can be increased (e.g., based on a number of items the user has interacted with).

In some examples, each item includes an associated item score on a per recipient basis. For example, an author user can generate the item and can distribute the item to a plurality of users of the social networking service including a first user and a second user. A first item score can be associated with the item and can be determined based on a social affinity between the first user and the author user, a social affinity between the first user and the other users to which the item was distributed, a social affinity between the first user and other users interacting with the item (e.g., commenting on the item, endorsing the item, sharing the item), an interaction of the first user with the item (e.g., commenting on the item, endorsing the item, sharing the item), item content and/or quality associated with the author user. A second item score can be associated with the item and can be determined based on a social affinity between the second user and the author user, a social affinity between the second user and the other users to which the item was distributed, a social affinity between the second user and other users interacting with the item (e.g., commenting on the item, endorsing the item, sharing the item), an interaction of the second user with the item (e.g., commenting on the item, endorsing the item, sharing the item), item content and/or quality associated with the author user. The first score can be different from the second score. Consequently, the item can include an associated timestamp and f associated item scores, each of the associated items scores being particular to a non-author user.

A social affinity between a particular user of the social networking service and other users of the social networking service can be determined based on a social graph of the particular user. In some examples, a social graph can refer to a single social graph or multiple interconnected social graphs. Distinct social graphs can be generated for different types of connections a user has. For example, a user can be connected with chat contacts in one social graph, email contacts in a second social graph, and connections (or contacts) from a particular social networking service in a third social graph. Each social graph can include edges to additional individuals or entities at higher degrees of separation from the user. These contacts can in turn have additional contacts at another degree of separation from the user. Similarly, a user's connection to someone in a particular social network can then be used to identify additional connections based on that person's connections. The distinct social graphs can include edges connecting one or more social graph to one or more other social graphs.

Types of connections and social graphs can include, but are not limited to other users in which the user is in direct contact (e.g., user mail or chat contact, direct contacts on social sites) and users in which the user is in indirect contact (e.g., friends of friends, connections of users that have a direct connection to the user). In some implementations, the social graph includes content generated by individuals (e.g., blog posts, reviews) as connections to the user. The social graph can include connections within a single network or across multiple networks (separable or integrated). Public social graph relationships can also be considered. In some examples, public relationships can be established through public profiles and/or public social networking services.

A social affinity score can be determined for a connection between a user and another user. The social affinity score can reflect a strength of a relationship between the users. By way of non-limiting example, a first user can be connected to a second user and a third user. The first user and the second user can be in frequent contact with one another via the social networking service (e.g., often sharing items with one another), email and/or chat. A first social affinity score can be provided based on the interaction between the first user and the second user. The first user and the third user might be infrequently in contact with one another. For example, the first user might have received an email from the third user only once in the last several months. A second social affinity score can be provided based on the interaction between the first user and the third user. In this example, the first social affinity score is exceeds the second social affinity score, reflecting a closer relationship between the first user and the second user than between the first user and the third user.

For purposes of illustration, an example social networking service will be described. The example social networking service enables users to organize contacts into social circles. It is appreciated, however, that implementations of the present disclosure can be used in other types of social networking services and are not limited to social networking services that include social circles.

In general, social circles are categories to which a user can assign contacts and better control the distribution and visibility of social networking posts and/or other digital content distributed using the social networking service. In some implementations, a social circle can be provided as a data set defining a collection of contacts that are associated with one another in a computer-implemented social networking service. Generally, a social circle can be described from the perspective of an individual that is the center of a particular collection of socially interconnected people, or from the aggregate perspective of a collection of socially interconnected people. A social circle can have narrowly defined boundaries (e.g., members of the social circle might be familiar with one another) and permission may be required for a member to join a social circle. A user of the social networking service can define a social circle. The social circle, as a data set defining a collection of contacts, may reflect real-life social connections and/or interactions of the user. In some implementations, a social circle can be defined by a user as a personal representation or grouping of a set of contacts, the contacts may be unaware of the social circle and/or unaware of other members of the social circle.

Through the creation and use of social circles, the user can organize and categorize social networking contacts into various different groupings that can be used to control the visibility and access those contacts have to the user's postings, digital pictures, videos, audio files, hyperlinks (e.g., uniform resource indicators, URIs), and/or other content associated with the user's social networking profile. As one example, the user can post an update about a work-related nuance to only a "coworker" circle, and spare other contacts within the social networking service from seeing information that is irrelevant to them.

FIG. 1 is a diagram of an example network architecture 100. The network architecture 100 includes a number of client devices 102, 104, 106, 108, 110 communicably connected to a server system 112 by a network 114. The server system 112 includes a processing device 116 and a data store 118. The processing device 116 executes computer instructions (e.g., social network computer program code, and/or IM computer program code) stored in the data store 118 to perform the functions of a social network server and/or IM server.

Users of the client devices 102, 104, 106, 108, 110 access the server device 112 to participate in a social networking service. For example, the client devices 102, 104, 106, 108, 110 can execute web browser applications that can be used to access the social networking service and/or an IM service. In another example, the client devices 102, 104, 106, 108, 110 can execute software applications that are specific to the social networking service and/or the IM service (e.g., social networking and/or IM "apps" running on smartphones).

Users interacting with the client devices 102, 104, 106, 108, 110 can participate in the social networking service provided by the server system 112 by digital content, such as text comments (e.g., updates, announcements, replies), digital images, videos, audio files, and/or other appropriate digital content. In some implementations, information can be posted on a user's behalf by systems and/or services external to the social networking service or the server system 112. For example, the user may post a review of a movie to a movie review website, and with proper permissions that website may cross-post the review to the social networking service on the user's behalf. In another example, a software application executing on a mobile device, with proper permissions, may use global positioning system (GPS) capabilities to determine the user's location and automatically update the social network with his location (e.g., "At Home", "At Work", "In Brownsdale, Minn."). Generally, users interacting with the client device 102, 104, 106, 108, 110 can also use the social networking service provided by the server system 112 to define social circles to organize and categorize the user's relationships to other users of the social networking service. Examples of the creation and use of social circles are provided in the description of FIG. 2.

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
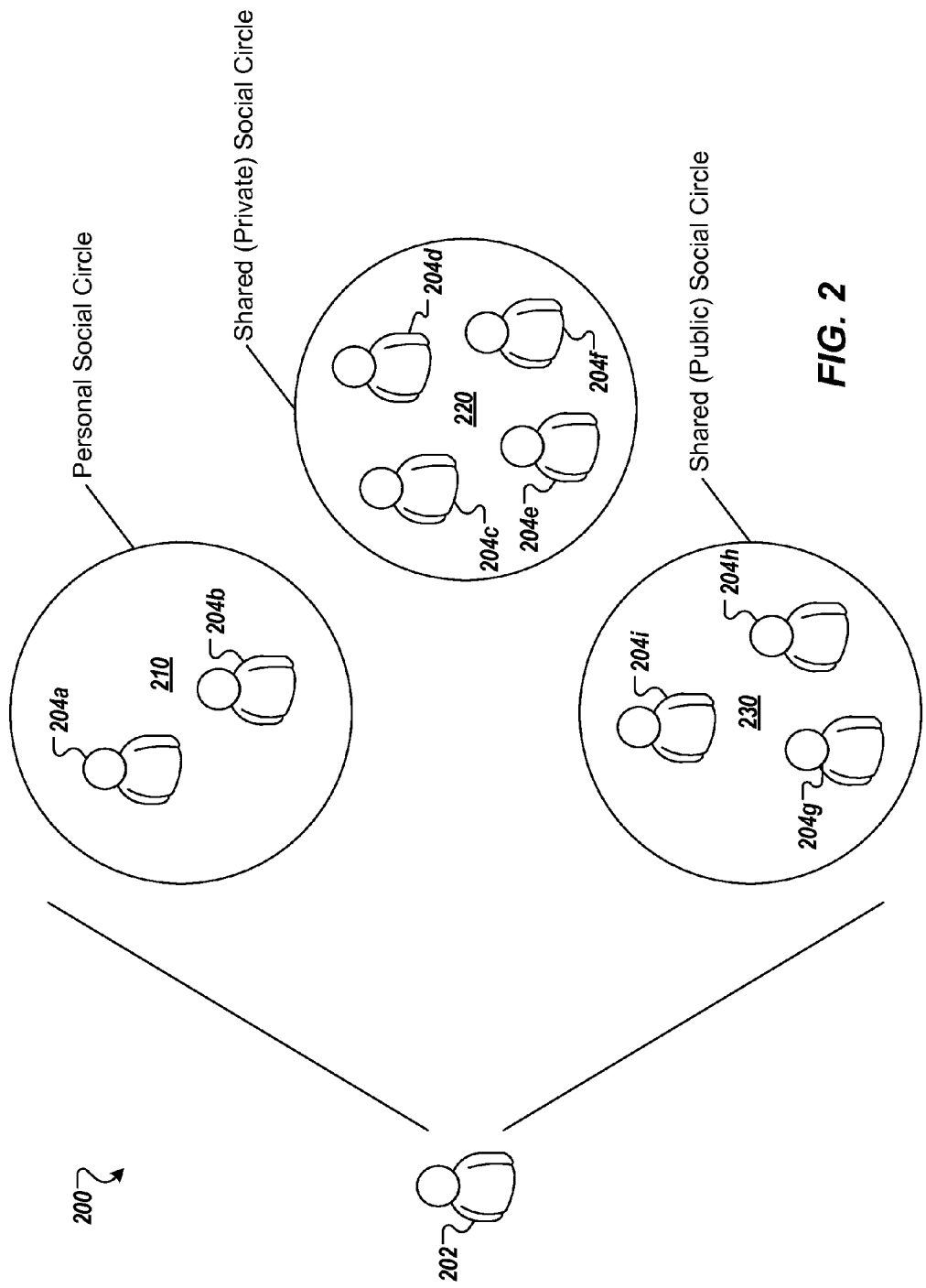
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230. A social circle 240, which has a number of contacts 242a-242c, is provided as a query-based social circle that can be automatically generated without input from the user 202. In some implementations, the social circle 240 can be generated based on information gathered from and has some commonality among the user 202 and the users 242a-242c (e.g., posts, uploaded photos, check-ins, volunteered location information).

The social circle 210 is a personal circle. In some implementations, personal circles are groupings created by and may be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal circles may be used to organize and categorize the contacts 204a-204i in ways that are relevant to the user 202. In some implementations, the user 202 may use personal social circles to organize contacts in order to discretely target which of his contacts 204a-204i will see certain postings or have access to particular information. For example, the user 202 may be planning a surprise party for a small group of friends. As such, the user can organize contacts into "Surprise Party Attendees" and "Surprise Party Honorees" personal circles. By doing so, the user 202 may better target selected postings to the friends attending and/or helping to plan the surprise party (e.g., Surprise Party Attendees), while targeting selected postings to friends that are to be honored at the surprise party (e.g., Surprise Party Honorees) to maintain the integrity of the surprise.

The social circle 220 is a shared private circle, which may also be referred to simply as a shared circle. In general, shared private circles are social circles that the user 202 creates and invites contacts to voluntarily join. Contacts that accept the invitation become members of the shared private circle. Members of a shared private circle can see information posted to that circle by the user 202 and can post information to be shared with other members of the shared private circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private circle and invite some or all of the contacts 204a-204i to join. With the "jokes" social circle in place, the user 202 may post witticisms to the "jokes" circle, and only those contacts who have accepted the invitation are able to see the comicality of the user 202. Similarly, members of the shared private circle are able to post messages to the circle, and those posts are visible to other members of that circle.

The social circle 230 is a shared public circle. In general, shared public circles are social circles that the user 202 creates, and invites contacts to voluntarily join. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download MP3s of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle may be automatic upon request, or may require the user's 202 approval to become members of the shared public circle.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles as discussed in further detail herein.

As discussed herein, digital content can be distributed to contacts within the social networking service including one or more social circles, such that they are exclusively viewable by the indicated contacts and/or contacts within one or more indicated social circles. For example, a user of the social networking service can generate a post and indicate one or more social circles for distribution of the post. In some implementations, an auto-complete component enables the user to type in part of the name of a social circle and/or individual contact to specify which social circles and/or individual contacts require delivery of the post content. During a post write-time, a post data set is transmitted from the user's client computing device (e.g., client device 102 of FIG. 1) to a distribution hub, which can be provided at a server (e.g., server system 112 of FIG. 1). The post data set includes a plurality of data. In some implementations, the post data set includes post content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post).

In some implementations, and as discussed in further detail herein, other data can be appended to post data sets. Example other data can be spam indication data and scoring data. In some examples, spam indication data can be appended to a post data set to indicate that the post data set is considered to be spam. In some examples, scoring data can include a social affinity score among other possible scoring data.

In some implementations, the scoring data can be recipient specific. In some examples, the scoring data can include social affinity data that is provided based on respective social affinity scores between an author of the post and each recipient of the post. For example, a first user can author a post and define a distribution of the post, creating an underlying post data set. The distribution can include a second user and a third user. A first social affinity score associated with a social relationship between the first user and the second user can be provided, and a second social affinity score associated with a social relationship between the first user and the third user can be provided. The first social affinity score can be different from the second social affinity score, reflecting different social relationships between the first user and the second user and the first user and the third user. The first social affinity score and the second social affinity score can be appended to the post data set and/or stored in another location while maintaining an association with the post data set.

In some implementations, the distribution data is processed to provide an access control list (ACL) that specifies which contacts within the social networking system are granted access to the post content. In some implementations, social affinity scores can also be processed to provide the ACL. For example, the distribution data can indicate that the post content is to be accessible by and/or distributed to a particular user. A social affinity score can be determined for the post and can be specific to a relationship between the post recipient and the author of the post. In some examples, if the social affinity score is below a threshold score, it is determined that the post content will not be accessible by and/or distributed to the particular user. Consequently, although the particular user had been explicitly targeted for distribution of the post by the author, the particular user is not provided in the ACL for the post. In some examples, if the social affinity score is at or above the threshold score, it is determined that the post content will be accessible by and/or distributed to the particular user. Consequently, the particular user had been explicitly targeted for distribution of the post by the author and the particular user is provided in the ACL for the post.

Generally, the distribution hub determines end points the post data set is to be distributed to based on the ACL. More specifically, the set of contacts that may care about the post and/or that are allowed access to the post is determined based on the ACL, and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user. In some implementations, and as discussed in further detail herein, the ACL can be provided based on the overall score, the quality score and/or the social affinity score.

Figure 3:
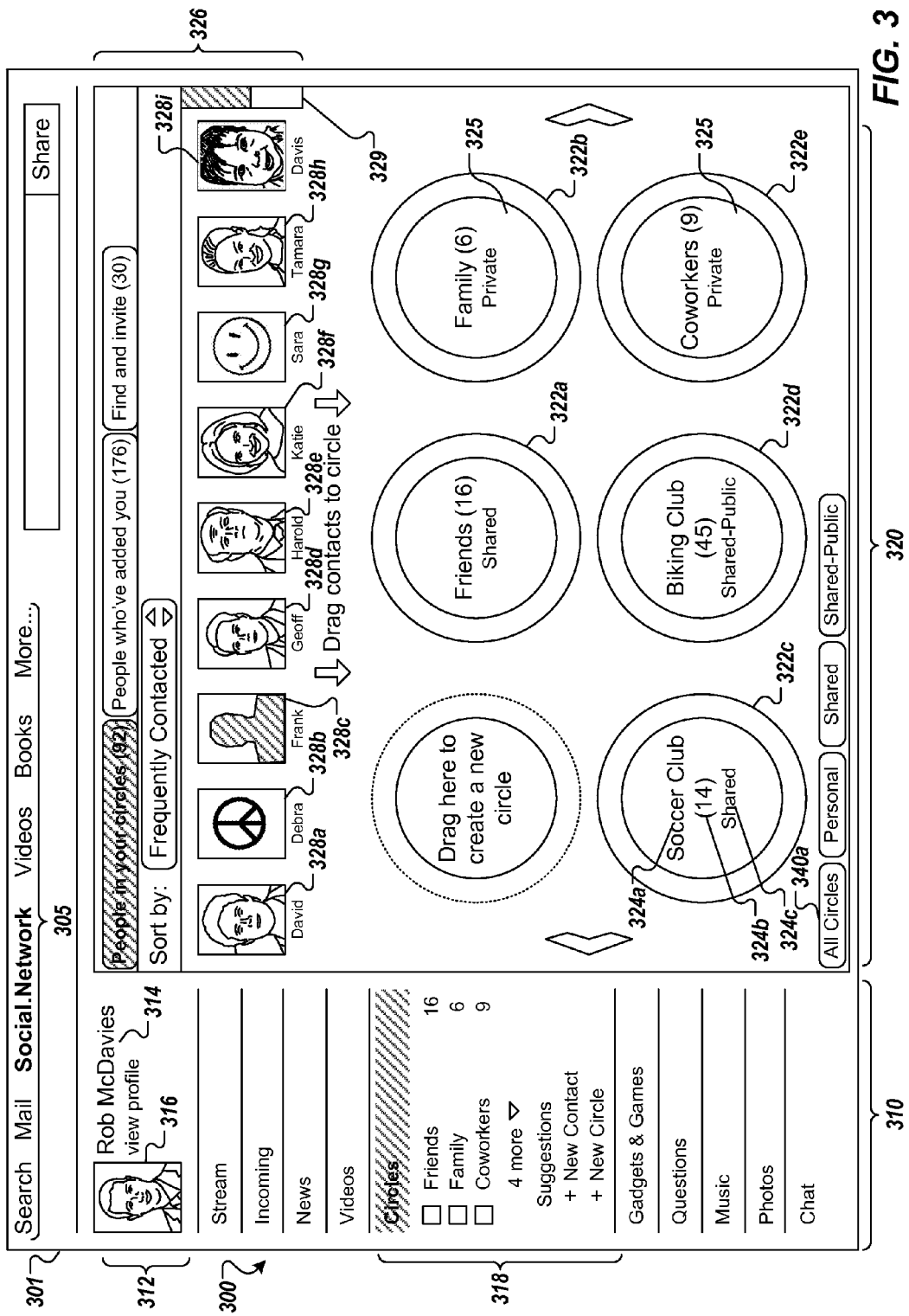
FIG. 3 depicts a screen-shot of example graphical user interface for creating and maintaining social circles.

FIG. 3 depicts a screen-shot 300 of an example graphical user interface for creating and maintaining social circles. In the screen-shot 300, a social graph editor user interface (UI) 301 is shown. In some implementations, the UI 301 can be the interface presented by a purpose made social networking application, while in some implementations the UI 301 can be one or more web pages of a social networking website displayed in a general purpose web browser.

In the example of FIG. 3, the UI 301 includes a number of choices presented in a menu bar 305. In the present example, the "Social Network" choice has been selected by a user. This selection causes a web-based social networking application to be executed and a social network menu 310 to be displayed. The social network menu 310 includes a profile indicator 312 in which information such as a user name 314 and a user image 316 associated with the currently logged in user are displayed.

The social network menu 310 also displays, among other items, a social circles sub-menu 318. The social circles sub-menu 318, when selected (e.g., as represented by the highlighting of the submenu's title), causes a social circle display 320 to be presented. The social circle display 320 includes a number of circles 322a-322e that are visual representations of various social circles that the user has created or has permission to edit. Each of the circles 322a-322e displays information about the social circle it represents. For example, the circle 322c displays a name 324a, a count 324b of the number of contacts associated with the social circle, and an indication 324c of what kind of circle (e.g., personal, private shared, public shared) that the circle 322c is.

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital photos of the contacts they represent (e.g., the icons 328a, 328d), arbitrary images (e.g., the icons 328b, 328g), or placeholders (e.g., when the contact has no image associated with their account, such as the icon 328c). In some implementations, the icons can include additional information, such as the names of each contact. A scroll bar 329 is provided for the user to view additional contact icons that may not fit into the initial view.

Figure 4:
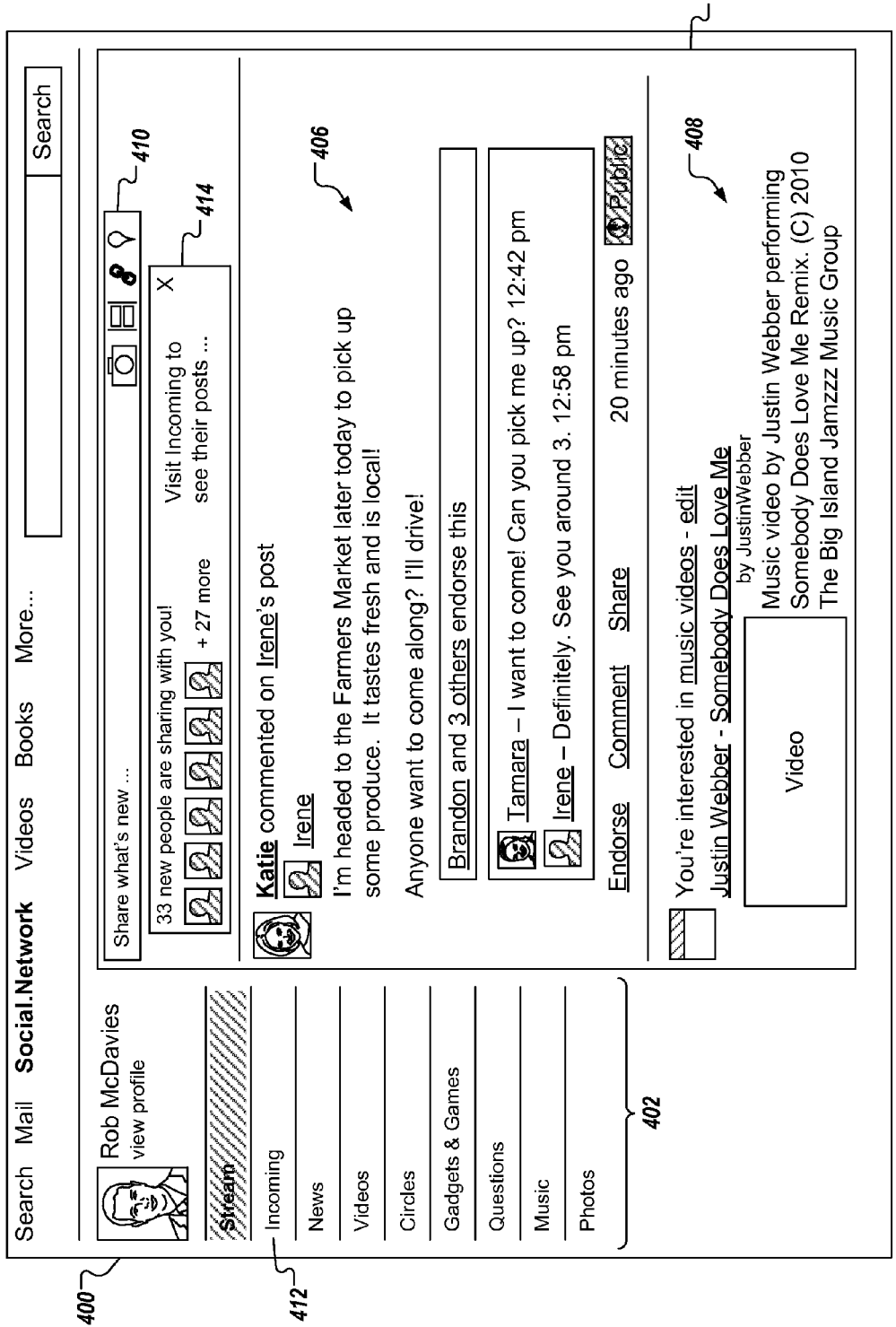
FIG. 4 depicts a screen-shot of an example stream page for a user of a social networking service.

FIG. 4 depicts a screen-shot of an example stream page 400 for a user of a social networking service. For example, the stream page 400 can be provided as a web page within a website of a social networking service, and can display digital content that has been shared with a user associated with the stream page 400. In the illustrated example, the example user includes "Rob McDavies" and the stream page 400 displays items (e.g., digital content) that other users have shared with the user and/or items that the user has shared with other users. The stream page 400 includes a social network menu 402 and an item region 404. Example items 406, 408 that have been distributed to the user are displayed in the item region 404. Generally, the items 406, 408 displayed in the item region 404 include digital content that is distributed to the user from contacts established within the social networking service. A content sharing interface 410 can also be provided in the item region 404. The user can activate (e.g., click on) the content sharing interface 410 to share digital content. Although two items 406, 408 are depicted in FIG. 4, it is appreciated that the stream page 400 can display any number of items to the user.

Implementations of the present disclosure are directed to determining which items and in what order to display to the user within a stream page of the user of the social networking service. As discussed above, each item that is distributed to the user includes an associated timestamp and an item score. When the user logs into the social networking service, a user-specific index of items that have been distributed to the user can be accessed. The index of items indicates items that can be displayed to the user within the stream page of the user. For each item in the index of items, a timestamp and an item score are provided. In some examples, the items are filtered based on item score, to remove items having scores that are less than a threshold score from being displayed to the users. The items are grouped based on timestamp. For each group, items within the group are put in rank order based on item score. The items are displayed to the user by group in ascending order of time and by the rank order within each group, as discussed in further detail herein.

In some implementations, each group can include an associated time range. By way of non-limiting example, a first group can include timestamps more recent than the last 24 hours, a second group can include timestamps within the last 1 day to 2 days, a third group can include timestamps within the last 2 days to 7 days, and a fourth group can include timestamps within the last 7 days to 1 month. It is appreciated that the described groups are merely examples and additional and/or different groups can be provided.

In some implementations, each item can be grouped based on a difference between a current time and the timestamp of the item. In some examples, the current time can include the time at which items are to be retrieved for display to the user (e.g., when the user logs into the social networking service, when the user clicks on the stream page, when the user refreshes the stream page, when the stream page is automatically refreshed).

As discussed above, the timestamp for an item can be determined based on weighting applied to events as they occur. For example, an item weight can be set to an initial value (e.g., 0) when the item is first distributed (e.g., when the author generates and distributes the item). The item weight can be modified, e.g., incremented, based on each event type. Example event types can include comment (e.g., the author user or a non-author user posts a comment to the item), endorsement (e.g., the author user or a non-author user endorses the item) and sharing (e.g., the author user or a non-author user redistributes or otherwise shares the item). For example, a comment to the item can increment the item weight by a first value and an endorsement of the item can increment the item weight by a second value. In some examples, the first value can be exceeds the second value, indicating that a comment is considered to be more substantial than an endorsement. The degree to which the item weight is incremented can also vary based on one or more characteristics of the event. An example characteristic can include a social affinity between the author user of the item and a non-author user performing the event. For example, the first value, discussed above, is higher for a user that has a high social affinity to the author user than for a user that has little, if any, social affinity to the author user.

Upon the occurrence of an event, the item weight is incremented and is compared to a threshold item weight. When the item weight is exceeds the threshold item weight, the timestamp of the item is set to the timestamp of the most recent event. For example, an item includes a first item weight that is less than the threshold item weight. A user posts a comment to the item at timestamp t. Consequently, an event of type comment occurred to the item at timestamp t. The first item weight is incremented to a second item weight. The second item weight is exceeds the threshold item weight. Consequently, the timestamp of the item is set equal to timestamp t, which is the timestamp of the event that resulted in the second item weight.

Data associated with the item, including the item weight and the timestamp, can be stored in an item repository (e.g., a database) and the data can be periodically updated. In some examples, the data is updated in response to the occurrence of an event to the item. The data associated with the item can be retrieved for ranking and ordering of the item within a stream page of a user, as discussed in further detail herein.

As noted above, items that are to be displayed to a user are organized into groups. Within each group, the items are put in an order based on item score. The item score (S) reflects a quality of the item and a relevance of the item to the particular user. In some implementations, the item score (S) is determined based on a quality score (QS), a social score (SS) and a relevance score (RS). In some implementations, the quality score is determined based on an author status score (VIP) and a content score (CS). Each of the scores is discussed in further detail below.

In some implementations, the item score is determined as a maximum of a first value and a second value. In some examples, the first value and the second value can be determined based on the quality score (QS), the social score (SS) and a smoothing function. In some examples, the first value is determined based on applying the smoothing function to SS and multiplying the result by QS. In some examples, the second value is determined based on applying the smoothing function to QS and multiplying the result by SS. In some examples, the item score is determined as a product of the maximum of the first value and the second value and the relevance score (RS). It is appreciated that the item score (S) can be determined based on other relationships between the quality score (QS), the social score (SS) and the relevance score (RS). For example, the item score (S) can be provided as the sum of the quality score (QS), the social score (SS) and the relevance score (RS).

The quality score (QS) is determined based on the status score (VIP) and the content score (CS). In some implementations, the quality score (QS) is determined as the sum of the status score (VIP) and the content score (CS). In some examples, weights are applied to each of the status score (VIP) and the content score (CS). In this manner, respective influences of the status score (VIP) and the content score (CS) on the quality score (QS) can be provided. For example, one or both of the status score (VIP) and the content score (CS) can be weighted such that the content score (CS) has a greater influence on the quality score (QS). It is appreciated that the quality score (QS) can be determined based on other relationships between the status score (VIP) and the content score (CS).

The status score (VIP) is an author-specific score and is determined based on characteristics of the author of the item within the social networking service. The status score can be based on one or more of the number of asymmetrical relationships that the author has within the social networking service, how often the author distributes items within the social networking service, how often other users interact with items distributed by the author (e.g., comment on, endorse, share), and how often the author interacts with other users of the social networking service. For example, a celebrity or a well-known blogger may have a status score that is greater than status scores of less known users of the social networking service.

To illustrate the status score (VIP), and by way of non-limiting example, a first author distributes a first item and a second author distributes a second item. The first author is a prolific user of the social networking service, receives a significant number of events to items that the first author distributes and is highly interactive with other users of the social networking service has a lot of followers. The second author rarely distributes items within the social networking service, receives little to no events to items that the second author does distribute and does not often interact with other users of the social networking service. In this example scenario, the status score of the first author is higher than the status score of the second author.

The content score (CS) is an item-specific score and is determined based on interactions of other users with the particular item. In some examples, the content score is determined based on a number of events to the item and the type of events. In some examples, negative events can also be considered in determining the content score. An example negative event can include one or more users muting the particular item, such that the item is no longer displayed in their respective stream pages. In some examples, the content score can be provided as a sum of a number of comments to the item, a number of endorsements of the item, a number of shares of the item and a number of mutes of the item. In some examples, respective weights can be applied to define an influence that each of the number of comments to the item, the number of endorsements of the item, the number of shares of the item and the number of mutes of the item has on the value of the content score. In some examples, the amount of content can influence the content score.

The social score (SS) is a user-specific, item-specific score and is determined based on a social affinity between the user that may be receiving the item in a stream page and the author user of the item. In some implementations, the social score is further determined based on social affinities between the user and other users to which the item was also distributed and that may have interacted with the item (e.g., commented on the item, endorsed the item, shared the item). In some examples, the social score can be provided as a sum of social affinity scores. For example, the social score can be provided as the sum of a social affinity score reflecting a social affinity of the user and the author user and a plurality of social affinity scores reflecting respective social affinities between the user and other users that have interacted with the item. In some examples, one or more weights can be applied to the respective social affinity scores to define an influence that each of the social affinity scores has on the social score. In some examples, the social affinity score between the user and the author user can be weighted more heavily than the social affinity scores between the user and other users that have interacted with the item.

To illustrate the social score (SS), and by way of non-limiting example, an author distributes a first item and a second item. The first item is distributed to a first set of users including a subject user. The second item is distributed to a second set of users also including the subject user. The subject user is a direct contact of each of the other users within the first set of users. The subject user is not a direct contact of any of the other users within the second set of users. A first social score is provided for the first item and a second social score is provided for the second item. The first social score and the second social score are each specific to the subject user. The first social score is determined based on a social affinity between the subject user and the author and respective social affinities between the subject user and each of the other users in the first set of users. The second social score is determined based on the social affinity between the subject user and the author and respective social affinities between the subject user and each of the other users in the second set of users. The first social score is greater than the second social score, because the subject user has higher social affinities to the other users in the first set of users than to the other users in the second set of users, the subject user being a direct contact of each of the other users in the first set of user.

The relevance score (RS) is a user-specific, item-specific score and is determined based on a relevance of the particular item to the user. In this manner, matching interests between the user and the subject of the item can be accounted for. In some examples, interests of the user can be determined explicitly and/or implicitly. In some examples, the user can explicitly identify interests within the social networking service. For example, the social networking service can provide a tool or service to promote discussion on certain topics relevant to the user. The user can provide topics that they are interested in (e.g., politics, green technology, sports) and other users can interact with the user to discuss each of the user-provided topics. As another example, the user's interactions with items distributed by other users within the social networking service can imply topics that the user is interested in. For example, the user often comments on, endorses and/or shares items that relate to politics, but rarely comments on, endorses or shares items that relate to sports. Consequently, it can be implied that the user is interested in politics and might not be interested in sports.

In determining the relevance score (RS), a topic of the item can be determined. In some examples, the topic of the item can be determined based on data underlying the item. For example, the item can include a link to a uniform resource locator (URL). The URL can be accessed and data provided at the URL can be reviewed to determine whether the URL corresponds to one or more topics. Using sports as an example topic, the URL can be a link to a sports news service or a sports team website. Consequently, it can be determined that the item relates to sports. As another example, the item can include text provided by the author. The text can be reviewed to determine whether the text corresponds to a specific topic. Again using sports as an example topic, the text can include "Are we getting together to watch the Stanley Cup finals?" Consequently, it can be determined that the item relates to sports, ice hockey in particular.

In some examples, one or more topics determined for the item can be compared to interests of the user. If there is no match between topic(s) and interest(s), the relevance score can be set equal to zero. If there are one or more matches, the relevance score can be set equal to a value greater than zero.

In some implementations, the relevance score can be determined based on the item contents and URL characteristics. In some examples, a content feature vector can be generated and can include a list of terms with corresponding weights. For example, ice-hockey:0.8; sports:0.4; winter:0.3. In some examples, user preferences can be provided as a feature vector. The numerical value is the probability of user interacting with an item on a specified topic. For example, a user vector can provide ice-hockey:0.2; tennis:0.6, which indicates that the particular user is much more likely to interact with items about tennis than with items about ice-hockey. In some examples, the relevance score is determined as a function of cross-product of the two vectors.

Figure 5:
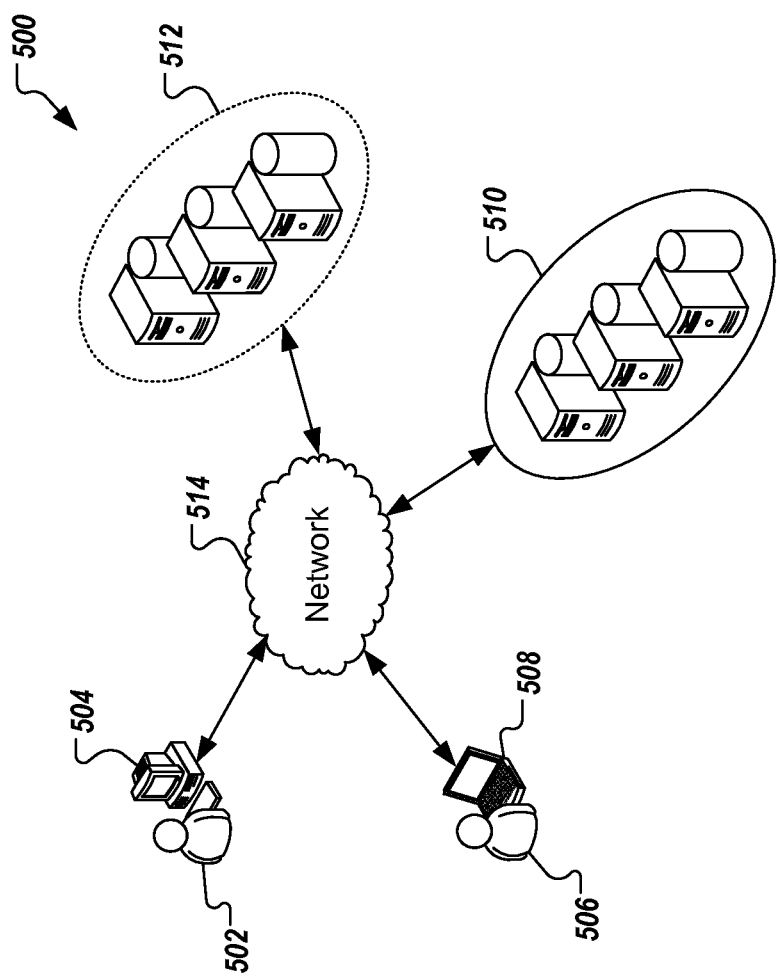
FIG. 5 depicts an example system for ranking and bumping items displayed in a stream page.

FIG. 5 depicts an example system 500 for ranking and ordering items displayed in a stream page. The example system 500 includes a first user 502 interacting with a first computing device 504, a second user 506 interacting with a second computing device 508, a first server system 510, a second server system 512 and a network 514. The first computing device 504, the second computing device 508, the first server system 510 and the second server system 512 can communicate with one another over the network 514.

In some implementations, a social networking service is provided and can be executed using the first and second server systems 510, 512. In some examples, the first server system 510 can receive, store and distribute items posted to the social networking service by users of the social networking service (e.g., the first user 502 and the second user 506). In some examples, the first server system 510 can monitor occurrences of events (e.g., item generation/distribution, comments, endorsements, sharing) and can determine which users are to receive the event (e.g., which users to deliver an item to). The first server system 510 can provide event data to the second server system. In some examples, the second server system 512 provides a scoring service. The scoring service can determine the scores discussed herein and can provide the scores to the first server system 510 for item ranking and ordering.

Figure 6A:
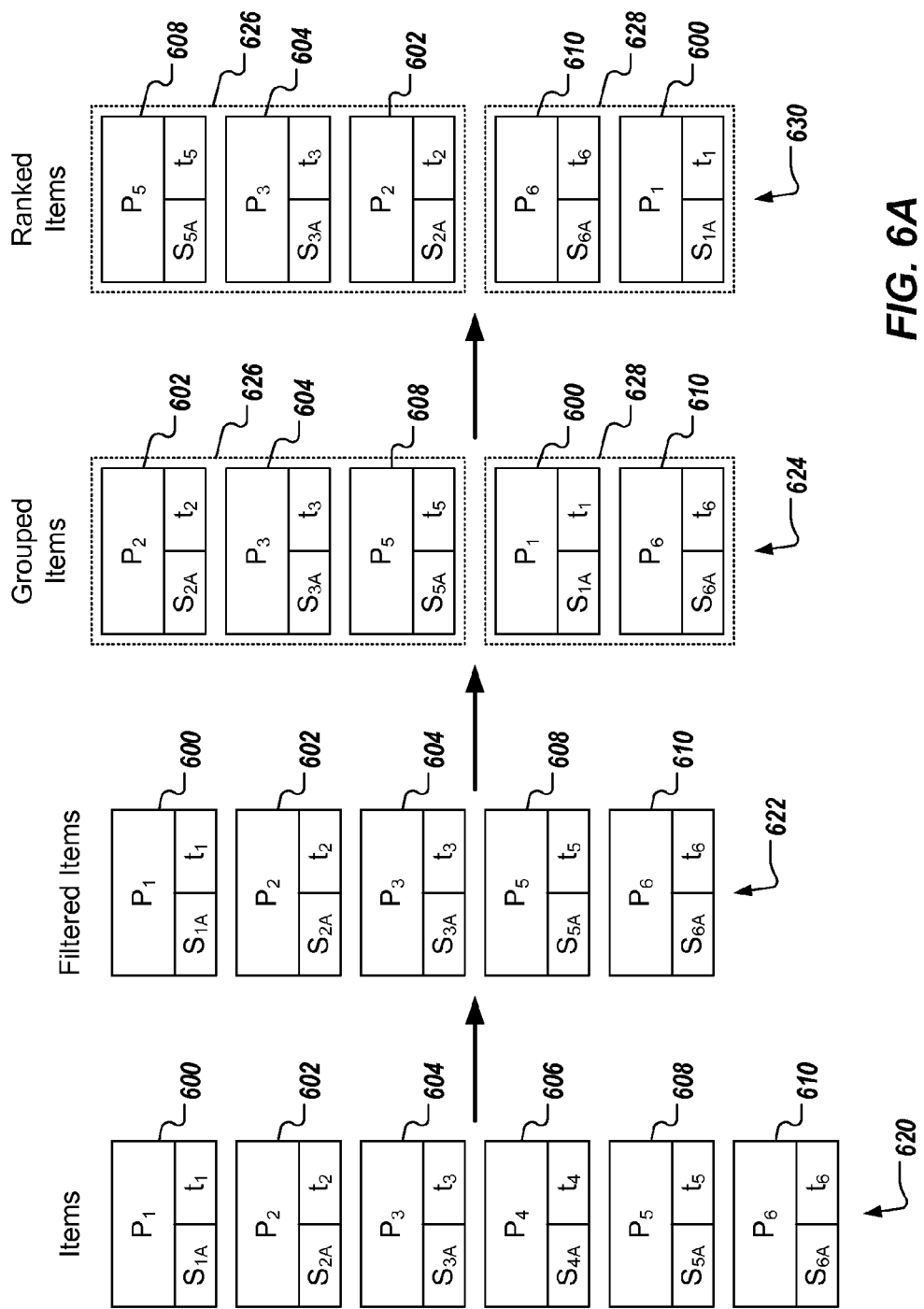
FIG. 6A depicts example ranking and ordering of example items in a stream page for a first user.

FIG. 6A depicts example ranking and ordering of example items in a stream page for a first user (e.g., the first user 502 of FIG. 5). FIG. 6A includes example items 600, 602, 604, 606, 608, 610. Each item 600, 602, 604, 606, 608, 610 includes digital content data ($P_1$, $P_2$, $P_3$, $P_4$, $P_5$, $P_6$, respectively), item score ($S_{1A}$, $S_{2A}$, $S_{3A}$, $S_{4A}$, $S_{5A}$, $S_{6A}$, respectively) and timestamp ($t_1$, $t_2$, $t_3$, $t_4$, $t_5$, $t_6$, respectively). The item scores are specific to the first user (e.g., User A). The item information can be provided in an index of items that is specific to the first user. In some examples, the timestamps are dynamic in that each timestamp can change based on events associated with the item over time, as discussed herein. In some examples, the item scores are dynamic in that each item score can change based on events and social relationships between the first user and other users (e.g., item author users) over time, as discussed herein. In some implementations, current item score and timestamp data are retrieved in response to a request to display items to the user (e.g., when the user logs into the social networking service, when the user clicks on the stream page, when the user refreshes the stream page, when the stream page is automatically refreshed). In some implementations, the item score and timestamp data are periodically updated. In some implementations, data stored in the index of items is automatically updated when a timestamp and/or an item score changes.

With continued reference to FIG. 6A, an initial collection of items 620 is provided. The initial collection of items 620 includes all items 600, 602, 604, 606, 608, 610. In some implementations, the items are filtered to provide filtered items 622. In some examples, the items can be filtered based on whether an item is considered to be undesirable. For example, each item can include data indicating whether the item is deemed to be spam. If a particular item is deemed to be spam, it can be filtered from being displayed to the first user. In some examples, an item can be deemed to be spam if the item is distributed to a number of users that exceeds a threshold number of users. In some examples, an item can be deemed to be spam if the item is distributed to a number of users that exceeds a threshold number of users and a social affinity score between the first user and the author of the item is below a threshold social affinity score (e.g., the author distributed the item to a large number of users and the first user has little, if any, social affinity to the author). In some examples, the items can be filtered based on item score. For example, each item score can be compared to a threshold item score and any items having an item score that is less than the threshold item score is filtered. In the example of FIG. 6A, the item 606 is filtered. Consequently, the filtered items include items 600, 602, 604, 608, 610.

The filtered items 622 are grouped based on timestamp to provide grouped items 624. In the depicted example, the grouped items include a first item group 626 and a second item group 628. By way of non-limiting example, the first item group 626 can include items having timestamps within the last 24 hours and the second item group 628 can include items having timestamps within the last 1 to 2 days. Continuing with this example, items 602, 604, 608 are provided in the first item group 626. Consequently, timestamps $t_2$, $t_3$, $t_5$ fall within the last 24 hours, where $t_2$ is more recent than $t_3$ which is more recent than $t_5$. Items 600, 610 are provided in the second item group 628. Consequently, timestamps $t_1$, $t_6$ fall within the last 1-2 days, where $t_1$ is more recent than $t_6$.

The grouped items 652 are ranked based on item score within the groups to provide ranked items 630. In the depicted example, $S_{5A}$ is greater than $S_{3A}$ which is greater than $S_{2A}$. Consequently, item 608 is ranked higher than item 604 and item 604 is ranked higher than item 602 even though $t_2$ is more recent than $t_3$ which is more recent than $t_5$. In the depicted example, $S_{6A}$ is greater than $S_{1A}$. Consequently, item 610 is ranked higher than item 600 even though $t_1$ is more recent than $t_6$. Accordingly, when the first user accesses the stream page the items will be displayed in the following order from top to bottom: item 608, item 604, item 602, item 610 and item 600. This order is specific to the first user, as illustrated further below.

Figure 6B:
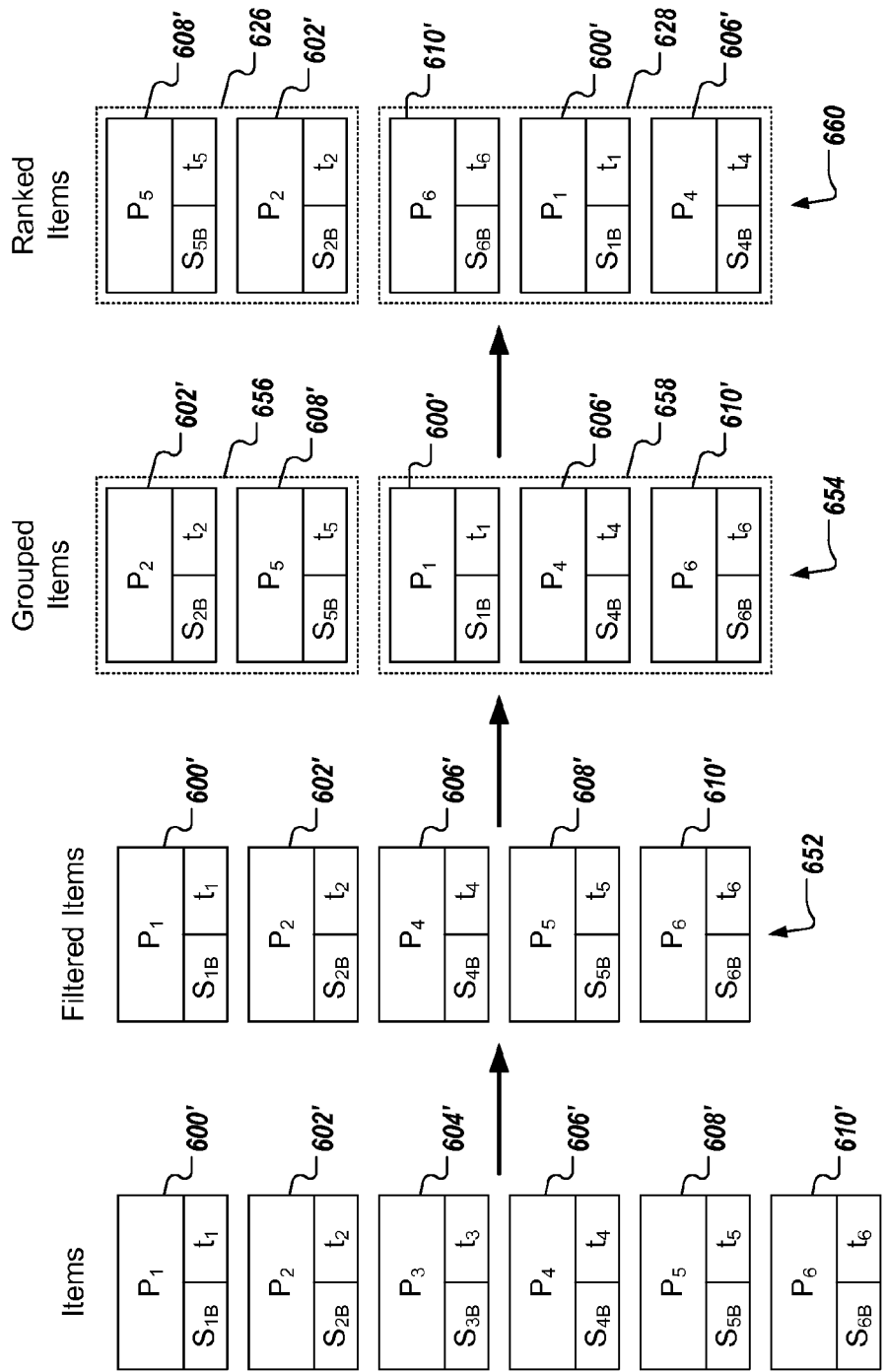
FIG. 6B depicts example ranking and ordering of the example items of FIG. 6A in a stream page for a second user.

FIG. 6B depicts example ranking and ordering of the example items of FIG. 6A in a stream page for a second user (e.g., the second user 506 of FIG. 5). FIG. 6B includes the example items 600', 602', 604', 606', 608', 610' of FIG. 6A. Each item 600', 602', 604', 606', 608', 610' includes the digital content data ($P_1$, $P_2$, $P_3$, $P_4$, $P_5$, $P_6$, respectively), item score ($S_{1B}$, $S_{2B}$, $S_{3B}$, $S_{4B}$, $S_{5B}$, $S_{6B}$, respectively) and timestamp ($t_1$, $t_2$, $t_3$, $t_4$, $t_5$, $t_6$, respectively). The item scores are specific to the second user (e.g., User B). The item information can be provided in an index of items that is specific to the second user. In some examples, the timestamps are dynamic in that each timestamp can change based on events associated with the item over time, as discussed herein. In some examples, the item scores are dynamic in that each item score can change based on events and social relationships between the second user and other users (e.g., item author users) over time, as discussed herein. In some implementations, current item score and timestamp data are retrieved in response to a request to display items to the second user (e.g., when the user logs into the social networking service, when the user clicks on the stream page, when the user refreshes the stream page, when the stream page is automatically refreshed). In some implementations, the item score and timestamp data are periodically updated. In some implementations, data stored in the index of items is automatically updated when a timestamp and/or an item score changes.

With continued reference to FIG. 6B, an initial collection of items 650 is provided. The initial collection of items 650 includes all items 600', 602', 604', 606', 608', 610'. Accordingly, the initial collection of items 650 for the second user corresponds to the initial collection of items 630 of the first used. This can occur, for example, if authors of the items distribute the items to both the first user and the second user. In some implementations, the items are filtered to provide filtered items 652, as discussed above. In the example of FIG. 6B, the item 604 is filtered. Consequently, the filtered items include items 600', 602', 606', 608', 610'.

The filtered items 652 are grouped based on timestamp to provide grouped items 654. In the depicted example, the grouped items include a first item group 656 and a second item group 658. By way of non-limiting example, the first item group 656 can include items having timestamps within the last 24 hours and the second item group 658 can include items having timestamps within the last 1 to 2 days. Continuing with this example, items 602', 608' are provided in the first item group 656. Consequently, timestamps $t_2$, $t_5$ fall within the last 24 hours, where $t_2$ is more recent than $t_5$. Items 600', 606', 610' are provided in the second item group 658. Consequently, timestamps $t_1$, $t_4$, $t_6$ fall within the last 1-2 days, where $t_1$ is more recent than $t_4$ which is more recent than $t_6$.

The grouped items 654 are ranked based on item score within the groups to provide ranked items 660. In the depicted example, $S_{5B}$ is greater than $S_{2B}$. Consequently, item 608' is ranked higher than item 602' even though $t_2$ is more recent than $t_5$. In the depicted example, $S_{6B}$ is greater than $S_{1B}$ which is greater than $S_{4B}$. Consequently, item 610' is ranked higher than item 600' and item 606' even though $t_1$ is more recent than $t_6$ and $t_4$ is more recent than $t_6$. Accordingly, when the second user accesses the stream page the items will be displayed in the following order from top to bottom: item 608, item 602, item 610, item 600 and item 606. This order is specific to the second user, as illustrated by comparing the order provided for the first user above.

In some implementations, dynamic ranking and ordering of items displayed to a user can be provided. Generally, timestamps and/or item scores can be updated in real-time (e.g., without user intervention) to dynamically update the groups and order within groups. In this manner, events occurring to items and/or author users, for example, can be dynamically considered and the ranking and ordering of items can be updated in real-time.

Figure 7:
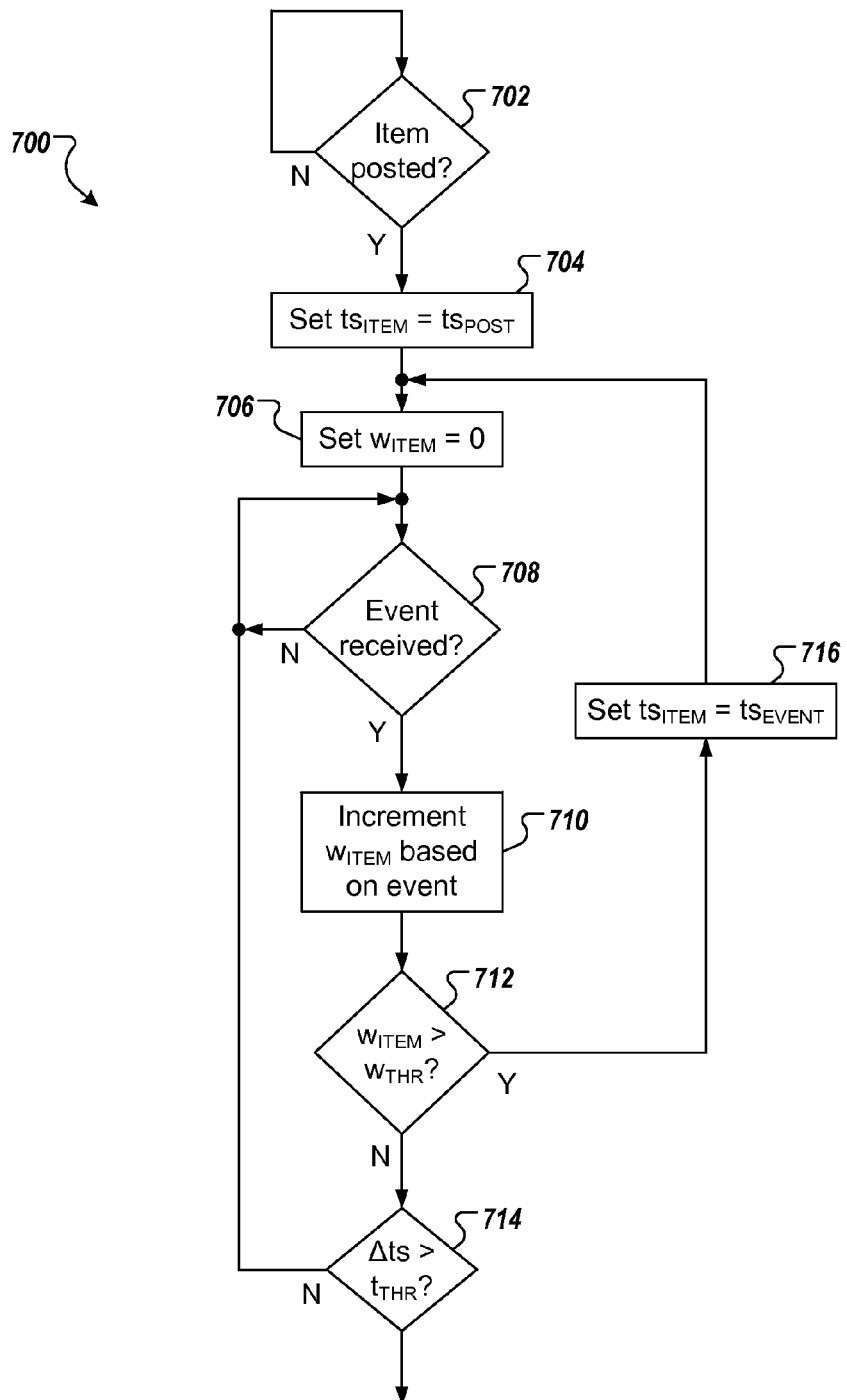
FIG. 7 is a flowchart of an example process that can be executed in implementations of the present disclosure.

FIG. 7 is a flowchart of an example process 700 that can be executed in implementations of the present disclosure. In some implementations, the example process 700 can include operations that are performed using one or more computer programs executed using one or more data processing apparatus (e.g., one or more client-side computing devices and/or one or more server-side computing devices). The example process 700 can be used for updating a timestamp of an item.

It is determined whether an item is posted (702). For example, an author user of a social networking service can generate an item and can post the item to the social networking service, as discussed herein. The item can be distributed to one or more users of the social networking service. If an item is posted, an item timestamp ($ts_{ITEM}$) is set equal to the timestamp at which the item was posted to the social networking service ($ts_{POST}$) (704). An item weight ($w_{ITEM}$) of the item is set equal to zero (706).

It is determined whether an event associated with the item is received (708). As discussed above, example events can include a comment to the item, an endorsement of the item and sharing of the item. If an event is not received, the process 700 loops back. If an event is received, $w_{ITEM}$ is incremented based on the event (710). For example, and as discussed above, $w_{ITEM}$ can be incremented based on event type and/or characteristics of the event. It is determined whether $w_{ITEM}$ exceeds a threshold item weight ($w_{THR}$) (712). If $w_{ITEM}$ exceeds $w_{THR}$, $ts_{ITEM}$ is set equal to the timestamp of the last event ($ts_{EVENT}$) (e.g., the event that resulted in incrementing $w_{ITEM}$) (716), and the process 700 loops back to reset $w_{ITEM}$ back to zero (706).

If $w_{ITEM}$ does not exceed $w_{THR}$, it can be determined whether a timed out condition has occurred. In some examples, events associated with the item and updating of $ts_{ITEM}$ is only performed for a threshold time (e.g., 1 month, 2 months, 3 months, 6 months, 1 year) from the occurrence of the last $ts_{ITEM}$ update. In such examples, a timestamp difference ($\Delta ts$) can be determined as a difference between a current time and $ts_{ITEM}$. It can be determined whether $\Delta ts$ exceeds a threshold time ($t_{THR}$) (714). If $\Delta ts$ exceeds $t_{THR}$, the example process 700 ends. If $\Delta ts$ does not exceed $t_{THR}$, the example process 700 loops back.

Figure 8:
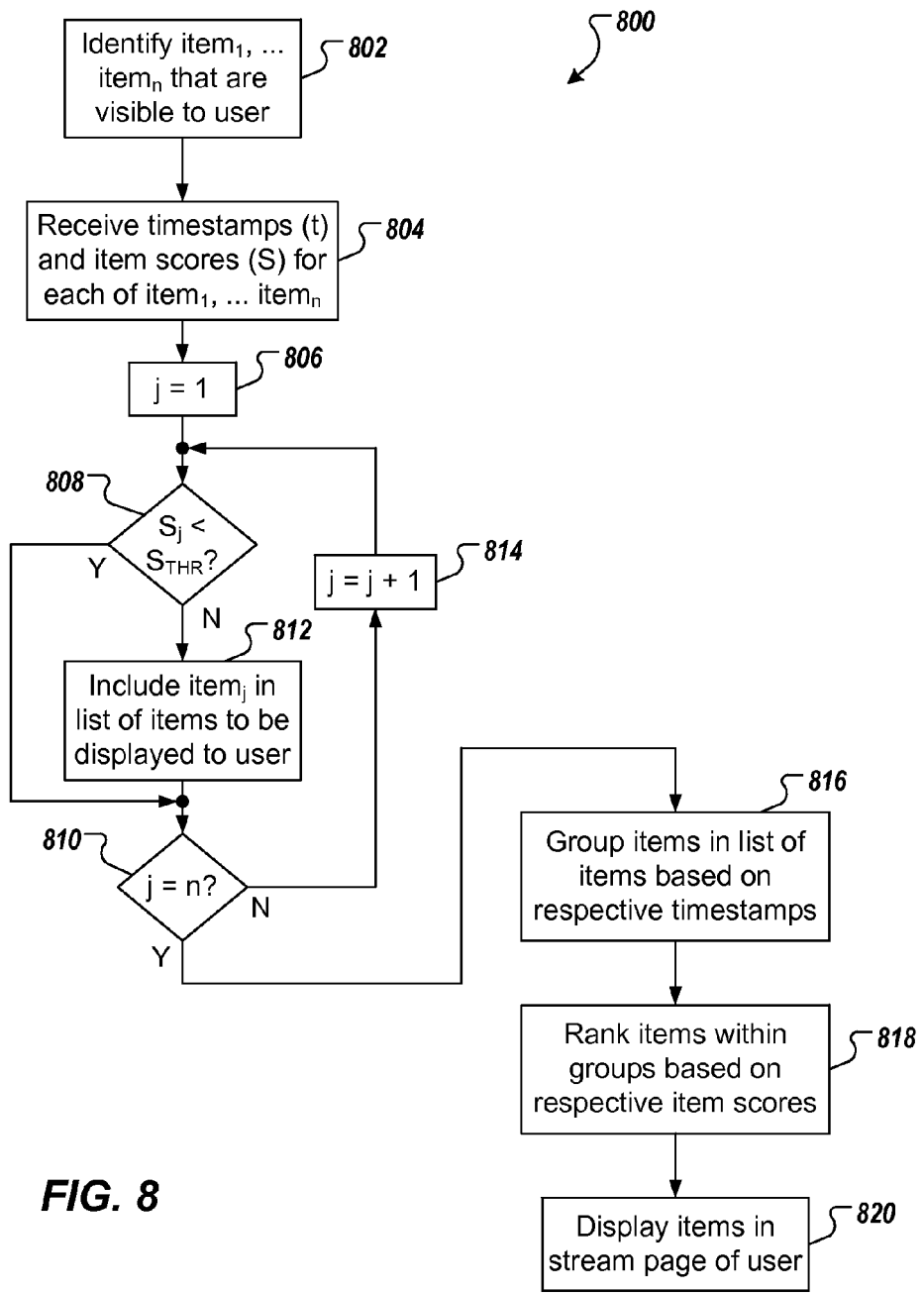
FIG. 8 is a flowchart of an example process that can be executed in implementations of the present disclosure.

FIG. 8 is a flowchart of an example process 800 that can be executed in implementations of the present disclosure. In some implementations, the example process 800 can include operations that are performed using one or more computer programs executed using one or more data processing apparatus (e.g., one or more client-side computing devices and/or one or more server-side computing devices). The example process 800 can be executed to order and rank items that are to be displayed to a user in a stream page.

One or more items ($item_1, \ldots, item_n$) that are visible to user are identified (802). For example, each item is generated and posted to the social networking service by an author and includes a distribution that includes the user. Consequently, each item is accessible, or otherwise visible to the user, such that each item can be displayed in a stream page of the user. In some examples, the items are identified in response to the user logging into the social networking service and/or a user request to display items in the stream page of the user. Respective timestamps (ts) and item scores (S) are received for the items (804). In some examples, the timestamp and item score data is received from an item repository (e.g., database).

A counter j is set equal to 1 (806). It is determined whether an item score ($S_j$) is less than a threshold item score ($S_{THR}$) (808). The item score $S_j$ is the item score associated with $item_j$ of the items $item_1, \ldots, item_n$. If $S_j$ is less than $S_{THR}$, it is determined whether j is equal to n (e.g., whether the item scores for each of $item_1, \ldots, item_n$ have been considered) (810). If $S_j$ is not less than $S_{THR}$, $item_j$ is added to a list of items that are too be displayed to the user (812). In this manner, items having an item score that is less than $S_{THR}$ (e.g., items that are considered to be spam) are filtered from being displayed to the user. If j is not equal to n, j is incremented (814) and the process 800 loops back to compare the next item score to $S_{THR}$. If j is equal to n, the list of items that are to be displayed to the user is complete.

Items in the list of items that are to be displayed to the user are grouped based on the respective timestamps (816). Items within each group are ranked based on the respective item scores (818). The items are displayed to the user in the stream page and are ranked and ordered in the display (820), and the process 800 ends.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results.

What is claimed is:

1. A system comprising:
   a computing device; and
   a computer-readable medium coupled to the computing device and having instructions stored thereon which, when executed by the computing device, cause the computing device to perform operations comprising:
      grouping items of digital content in a subset of items based on respective distribution times associated with each item to provide a plurality of item groups, the plurality of item groups comprising a first item group comprising items having respective distribution times within a first distribution time range, and a second item group comprising items having respective distribution times within a second distribution time range, the second distribution time range being different from the first distribution time range;
      for each item group, determining an order of items based on respective scores associated with each item, the first item group including a first order based on respective scores of items in the first group, and the second item group including a second order based on respective scores of items in the second group; and
      transmitting instructions to display a combination of items of the first item group and items of the second item group based on the first order and the second order, and where items of the first item group are displayed ahead of items in the second item group based on the first distribution time range and the second distribution time range.

2. The system of claim 1, wherein the order comprises a descending order based on score.

3. The system of claim 1, wherein operations further comprise receiving a plurality of distribution times, each distribution time including the respective distribution time that is associated with an item of the plurality of items.

4. The system of claim 3, wherein grouping items is achieved by:
   comparing each distribution time of the plurality of distribution times to an distribution time range associated with the subset of items; and
   including an item in the subset of items when a respective distribution time of the item is within an item group that is associated with the distribution time range.

5. The system of claim 1, wherein each distribution time is determined based on a date and time that the respective item was made public.

6. The system of claim 1, wherein each of the respective scores is specific to a user.

7. The system of claim 1, wherein each score is based on at least one of a quality score and a relevance score.

8. The system of claim 7, wherein the quality score indicates a quality of an associated item.

9. The system of claim 7, wherein the relevance score is a user-specific, item-specific score and indicates a relevance of an associated item to the user.

10. Non-transitory computer storage media encoded with one or more computer programs, the one or more computer programs comprising instructions that when executed by data processing apparatus cause the data processing apparatus to perform operations comprising:

grouping items of digital content in a subset of items based on respective distribution times associated with each item to provide a plurality of item groups, the plurality of item groups comprising a first item group comprising items having respective distribution times within a first distribution time range, and a second item group comprising items having respective distribution times within a second distribution time range, the second distribution time range being different from the first distribution time range;

for each item group, determining an order of items based on respective scores associated with each item, the first item group including a first order based on respective scores of items in the first group, and the second item group including a second order based on respective scores of items in the second group; and transmitting instructions to display a combination of items of the first item group and items of the second item group based on the first order and the second order, and where items of the first item group are displayed ahead of items in the second item group based on the first distribution time range and the second distribution time range.

11. The medium of claim 10, wherein the order comprises a descending order based on score.

12. The medium of claim 10, wherein operations further comprise receiving a plurality of distribution times, each distribution time including the respective distribution time that is associated with an item of the plurality of items.

13. The medium of claim 12, wherein grouping items is achieved by:

comparing each distribution time of the plurality of distribution times to an distribution time range associated with the subset of items; and including an item in the subset of items when a respective distribution time of the item is within an item group that is associated with the distribution time range.

14. The medium of claim 10, wherein each distribution time is determined based on a date and time that the respective item was made public.

15. The medium of claim 10, wherein each of the respective scores is specific to a user.

16. A computer-implemented method that is executed using one or more processors, the method comprising:

grouping, by the one or more processors, items of digital content in a subset of items based on respective distribution times associated with each item to provide a plurality of item groups, the plurality of item groups comprising a first item group comprising items having respective distribution times within a first distribution time range, and a second item group comprising items having respective distribution times within a second distribution time range, the second distribution time range being different from the first distribution time range;

for each item group, determining, by the one or more processors, an order of items based on respective scores associated with each item, the first item group including a first order based on respective scores of items in the first group, and the second item group including a second order based on respective scores of items in the second group; and transmitting, by the one or more processors, instructions to display a combination of items of the first item group and items of the second item group based on the first order and the second order, and where items of the first item group are displayed ahead of items in the second item group based on the first distribution time range and the second distribution time range.

17. The method of claim 16, wherein operations further comprise receiving a plurality of distribution times, each distribution time including the respective distribution time that is associated with an item of the plurality of items.

18. The method of claim 17, wherein grouping items is achieved by:

comparing each distribution time of the plurality of distribution times to an distribution time range associated with the subset of items; and including an item in the subset of items when a respective distribution time of the item is within an item group that is associated with the distribution time range.

19. The method of claim 16, wherein each distribution time is determined based on a date and time that the respective item was made public.

20. The method of claim 16, wherein each of the respective scores is specific to a user.

* * * * *